(12) United States Patent
Sugahara et al.

(10) Patent No.: US 6,889,323 B2
(45) Date of Patent: May 3, 2005

(54) METHOD AND APPARATUS FOR CONTENTS INFORMATION

(75) Inventors: Takayuki Sugahara, Yokosuka (JP); Toshio Kuroiwa, Yokohama (JP); Wataru Inoha, Yokosuka (JP); Kenjiro Ueda, Yokosuka (JP); Seiji Higurashi, Tokyo (JP)

(73) Assignee: Victor Company of Japan, Ltd., Yokohama (JP)

( * ) Notice: Subject to any disclaimer, the term of this patent is extended or adjusted under 35 U.S.C. 154(b) by 896 days.

(21) Appl. No.: 09/726,434

(22) Filed: Dec. 1, 2000

(65) Prior Publication Data

US 2001/0011251 A1 Aug. 2, 2001

(30) Foreign Application Priority Data

Jan. 27, 2000 (JP) ........................................ 2000-018437

(51) Int. Cl.[7] ................................................ G06F 1/24
(52) U.S. Cl. ...................... 713/170; 713/182; 713/200; 713/201
(58) Field of Search ................................ 713/168, 171, 713/182, 200, 201, 170

(56) References Cited

U.S. PATENT DOCUMENTS

| | | | |
|---|---|---|---|
| 5,661,806 A | | 8/1997 | Nevoux et al. |
| 5,768,381 A | | 6/1998 | Hawthorne |
| 5,850,445 A | * | 12/1998 | Chan et al. ................. 380/247 |
| 5,949,877 A | * | 9/1999 | Traw et al. ................. 713/171 |
| 5,970,144 A | * | 10/1999 | Chan et al. ................. 380/247 |

FOREIGN PATENT DOCUMENTS

| | | |
|---|---|---|
| EP | 0385511 | 9/1990 |
| EP | 0422230 | 4/1991 |
| FR | 2778291 | 11/1999 |
| JP | 10-269289 | 10/1998 |
| JP | 10-283268 | 10/1998 |

* cited by examiner

Primary Examiner—Thomas R. Peeso
(74) Attorney, Agent, or Firm—Louis Woo

(57) ABSTRACT

A signal representative of a key is generated from authenticator-value information and key base information. The authenticator-value information represents a specified authenticator value. The key base information contains identification information which is set to reproduce the specified authenticator value according to a predetermined degeneration function. Contents information is encrypted into encryption-resultant contents information in response to the key signal. The key base information and the encryption-resultant contents information are transmitted or recorded.

20 Claims, 8 Drawing Sheets

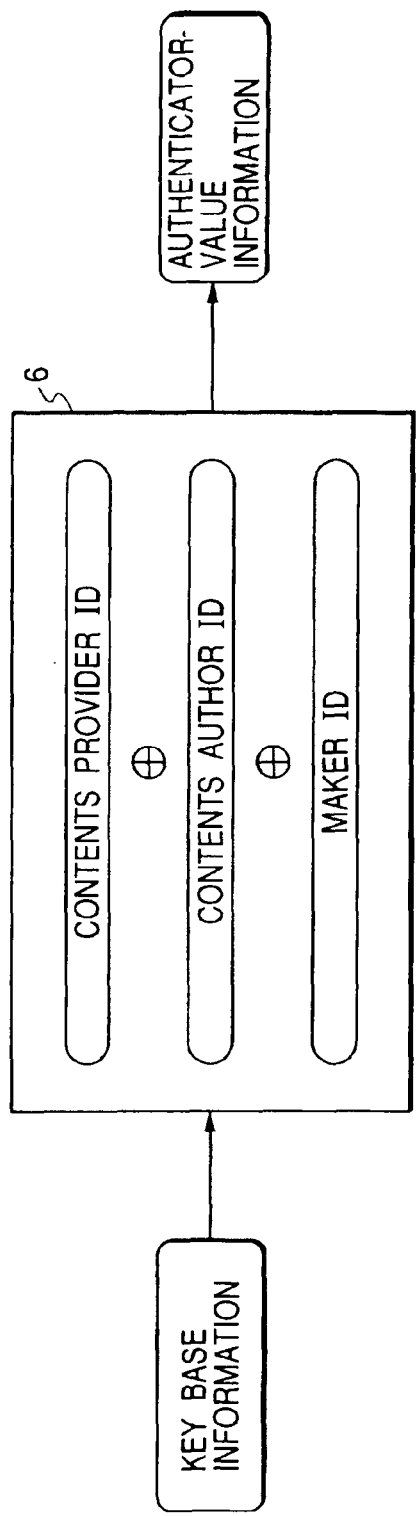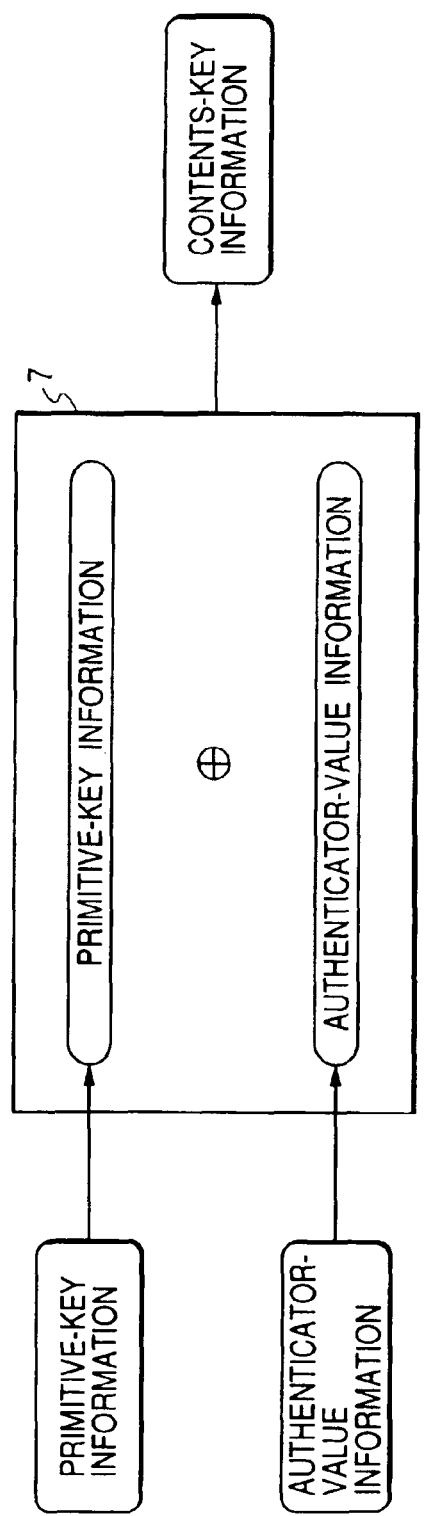

METHOD AND APPARATUS FOR CONTENTS INFORMATION

BACKGROUND OF THE INVENTION

1. Field of the Invention

This invention relates to a method of transmitting contents information. Also, this invention relates to a method of recording contents information. In addition, this invention relates to an apparatus for transmitting contents information. Furthermore, this invention relates to an apparatus for recording contents information. Also, this invention relates to a transmission medium. In addition, this invention relates to a recording medium. Furthermore, this invention relates to a method of decrypting contents information. Also, this invention relates to an apparatus for decrypting contents information.

2. Description of the Related Art

Japanese published unexamined patent application 10-269289 discloses a system for managing the distribution of digital contents. In the system of Japanese application 10-269289, a distributor side encrypts and compresses digital contents into processing-resultant digital contents. The distributor side transmits the processing-resultant digital contents, an encryption-resultant contents key, and encryption-resultant accounting information to a communication opposite party. The distributor side implements a process of receiving a charge on the basis of contents use information transmitted from the communication opposite party. Then, the distributor side implements a process of dividing the received charge among interested persons including a copyright holder of the digital contents. On the other hand, a user side (a digital contents player) decrypts and expands the processing-resultant digital contents in response to the contents key, thereby reproducing the original digital contents. The user side subjects the accounting information to a reducing process responsive to the use of the digital contents. The user side transmits the reduced accounting information and the contents use information to the distributor side.

Japanese published unexamined patent application 10-283268 discloses a system in which a recording medium stores encryption-resultant main information, and also encryption-resultant information representing a key for decrypting the encryption-resultant main information. Non-encrypted information representing conditions of decrypting the encryption-resultant main information is added to the encryption-resultant key information. In more detail, the encryption-resultant key information has non-encrypted control information which contains device information and region information. The control information is designed to prevent the encryption-resultant main information from being copied onto a magnetic recording medium or an optical disc in a user side for illegal use thereof.

The system of Japanese application 10-283268 has a problem as follows. The non-encrypted control information in the encryption-resultant key information can easily be altered by a third person. The alteration of the non-encrypted control information enables the third person to illegally copy the encryption-resultant main information.

SUMMARY OF THE INVENTION

It is a first object of this invention to provide an improved method of transmitting contents information.

It is a second object of this invention to provide an improved method of recording contents information.

It is a third object of this invention to provide an improved apparatus for transmitting contents information.

It is a fourth object of this invention to provide an improved apparatus for recording contents information.

It is a fifth object of this invention to provide an improved transmission medium.

It is a sixth object of this invention to provide an improved recording medium.

It is a seventh object of this invention to provide an improved method of decrypting contents information.

It is an eighth object of this invention to provide an improved apparatus for decrypting contents information.

A first aspect of this invention provides a method of transmitting contents information. The method comprises the steps of generating a signal representative of a key from authenticator-value information and key base information, the authenticator-value information representing a specified authenticator value, the key base information containing identification information which is set to reproduce the specified authenticator value according to a predetermined degeneration function; encrypting contents information into encryption-resultant contents information in response to the key signal; and transmitting the key base information and the encryption-resultant contents information.

A second aspect of this invention provides a method of recording contents information. The method comprises the steps of generating a signal representative of a key from authenticator-value information and key base information, the authenticator-value information representing a specified authenticator value, the key base information containing identification information which is set to reproduce the specified authenticator value according to a predetermined degeneration function; encrypting contents information into encryption-resultant contents information in response to the key signal; and recording the key base information and the encryption-resultant contents information.

A third aspect of this invention provides a method of transmitting contents information. The method comprises the steps of generating a signal representative of a key from authenticator-value information and key base information, the authenticator-value information representing a specified authenticator value, the key base information containing identification information which is set to reproduce the specified authenticator value according to a predetermined degeneration function; encrypting at least the identification information in the key base information to convert the key base information into encryption-resultant key base information; encrypting contents information into encryption-resultant contents information in response to the key signal; and transmitting the encryption-resultant key base information and the encryption-resultant contents information.

A fourth aspect of this invention provides a method of recording contents information. The method comprises the steps of generating a signal representative of a key from authenticator-value information and key base information, the authenticator-value information representing a specified authenticator value, the key base information containing identification information which is set to reproduce the specified authenticator value according to a predetermined degeneration function; encrypting at least the identification information in the key base information to convert the key base information into encryption-resultant key base information; encrypting contents information into encryption-resultant contents information in response to the key signal; and recording the encryption-resultant key base information and the encryption-resultant contents information.

A fifth aspect of this invention provides an apparatus for transmitting contents information. The apparatus comprises means for generating a signal representative of a key from authenticator-value information and key base information, the authenticator-value information representing a specified authenticator value, the key base information containing identification information which is set to reproduce the specified authenticator value according to a predetermined degeneration function; means for encrypting at least the identification information in the key base information to convert the key base information into encryption-resultant key base information; means for encrypting contents information into encryption-resultant contents information in response to the key signal; and means for transmitting the encryption-resultant key base information and the encryption-resultant contents information.

A sixth aspect of this invention provides an apparatus for recording contents information. The apparatus comprises means for generating a signal representative of a key from authenticator-value information and key base information, the authenticator-value information representing a specified authenticator value, the key base information containing identification information which is set to reproduce the specified authenticator value according to a predetermined degeneration function; means for encrypting at least the identification information in the key base information to convert the key base information into encryption-resultant key base information; means for encrypting contents information into encryption-resultant contents information in response to the key signal; and means for recording the encryption-resultant key base information and the encryption-resultant contents information.

A seventh aspect of this invention provides a transmission medium for transmitting encryption-resultant key base information and encryption-resultant contents information, wherein the encryption-resultant key base information and the encryption-resultant contents information are generated by the steps of generating a signal representative of a key from authenticator-value information and key base information, the authenticator-value information representing a specified authenticator value, the key base information containing identification information which is set to reproduce the specified authenticator value according to a predetermined degeneration function; encrypting at least the identification information in the key base information to convert the key base information into encryption-resultant key base information; and encrypting contents information into encryption-resultant contents information in response to the key signal.

An eighth aspect of this invention provides a recording medium loaded with encryption-resultant key base information and encryption-resultant contents information, wherein the encryption-resultant key base information and the encryption-resultant contents information are generated by the steps of generating a signal representative of a key from authenticator-value information and key base information, the authenticator-value information representing a specified authenticator value, the key base information containing identification information which is set to reproduce the specified authenticator value according to a predetermined degeneration function; encrypting at least the identification information in the key base information to convert the key base information into encryption-resultant key base information; and encrypting contents information into encryption-resultant contents information in response to the key signal.

A ninth aspect of this invention is based on the third aspect thereof, and provides a method wherein the identification information in the key base information contains at least one of 1) information about a region or regions corresponding to one or more countries, one or more zones, or one or more spaces, 2) information about identification of an individual, 3) information about identification of a group of persons, 4) information about a rating, 5) information about identification of an apparatus maker or a device maker, 6) information about identification of a contents provider, 7) information about time, 8) information about contents authors, 9) information about identification of a reproducing apparatus or a reproducing device, 10) information about identification of a connection apparatus or a connection device, 11) information about identification of a medium on which contents information is recorded, 12) information about identification of contents information, and 13) information about accounting.

A tenth aspect of this invention provides a method of transmitting contents information. The method comprises the steps of generating a signal representative of a key from key base information containing identification information which is set to reproduce a specified authenticator value according to a predetermined degeneration function; encrypting contents information into encryption-resultant contents information in response to the key signal; and transmitting the key base information and the encryption-resultant contents information.

An eleventh aspect of this invention provides a method of recording contents information. The method comprises the steps of generating a signal representative of a key from key base information containing identification information which is set to reproduce a specified authenticator value according to a predetermined degeneration function; encrypting contents information into encryption-resultant contents information in response to the key signal; and recording the key base information and the encryption-resultant contents information.

A twelfth aspect of this invention provides a method of transmitting contents information. The method comprises the steps of generating a signal representative of a key from key base information containing identification information which is set to reproduce a specified authenticator value according to a predetermined degeneration function; encrypting at least the identification information in the key base information to convert the key base information into encryption-resultant key base information; encrypting contents information into encryption-resultant contents information in response to the key signal; and transmitting the encryption-resultant key base information and the encryption-resultant contents information.

A thirteenth aspect of this invention provides a method of recording contents information. The method comprises the steps of generating a signal representative of a key from key base information containing identification information which is set to reproduce a specified authenticator value according to a predetermined degeneration function; encrypting at least the identification information in the key base information to convert the key base information into encryption-resultant key base information; encrypting contents information into encryption-resultant contents information in response to the key signal; and recording the encryption-resultant key base information and the encryption-resultant contents information.

A fourteenth aspect of this invention provides an apparatus for transmitting contents information. The apparatus comprises means for generating a signal representative of a key from key base information containing identification information which is set to reproduce a specified authenticator value according to a predetermined degeneration function; means for encrypting at least the identification information in the key base information to convert the key base information into encryption-resultant key base information; means for encrypting contents information into encryption-resultant contents information in response to the key signal; and means for transmitting the encryption-resultant key base information and the encryption-resultant contents information.

A fifteenth aspect of this invention provides an apparatus for recording contents information. The apparatus comprises means for generating a signal representative of a key from key base information containing identification information which is set to reproduce a specified authenticator value according to a predetermined degeneration function; means for encrypting at least the identification information in the key base information to convert the key base information into encryption-resultant key base information; means for encrypting contents information into encryption-resultant contents information in response to the key signal; and means for recording the encryption-resultant key base information and the encryption-resultant contents information.

A sixteenth aspect of this invention provides a transmission medium for transmitting encryption-resultant key base information and encryption-resultant contents information, wherein the encryption-resultant key base information and the encryption-resultant contents information are generated by the steps of generating a signal representative of a key from key base information containing identification information which is set to reproduce a specified authenticator value according to a predetermined degeneration function; encrypting at least the identification information in the key base information to convert the key base information into encryption-resultant key base information; and encrypting contents information into encryption-resultant contents information in response to the key signal.

A seventeenth aspect of this invention provides a recording medium loaded with encryption-resultant key base information and encryption-resultant contents information, wherein the encryption-resultant key base information and the encryption-resultant contents information are generated by the steps of generating a signal representative of a key from key base information containing identification information which is set to reproduce a specified authenticator value according to a predetermined degeneration function; encrypting at least the identification information in the key base information to convert the key base information into encryption-resultant key base information; and encrypting contents information into encryption-resultant contents information in response to the key signal.

An eighteenth aspect of this invention is based on the twelfth aspect thereof, and provides a method wherein the identification information in the key base information contains at least one of 1) information about a region or regions corresponding to one or more countries, one or more zones, or one or more spaces, 2) information about identification of an individual, 3) information about identification of a group of persons, 4) information about a rating, 5) information about identification of an apparatus maker or a device maker, 6) information about identification of a contents provider, 7) information about time, 8) information about contents authors, 9) information about identification of a reproducing apparatus or a reproducing device, 10) information about identification of a connection apparatus or a connection device, 11) information about identification of a medium on which contents information is recorded, 12) information about identification of contents information, and 13) information about accounting.

A nineteenth aspect of this invention provides a method of decrypting encryption-resultant contents information generated by an encrypting side which implements the steps of generating a signal representative of a key from authenticator-value information and key base information, the authenticator-value information representing a specified authenticator value, the key base information containing identification information which is set to reproduce the specified authenticator value according to a predetermined degeneration function; and encrypting contents information into encryption-resultant contents information in response to the key signal. The method comprises the steps of reproducing the authenticator-value information representative of the specified authenticator value from the identification information in the key base information according to the predetermined degeneration function; reproducing the key signal from the reproduced authenticator-value information and the key base information; and decrypting the encryption-resultant contents information into the original contents information in response to the reproduced key signal.

A twentieth aspect of this invention provides a method of decrypting encryption-resultant contents information generated by an encrypting side which implements the steps of generating a signal representative of a key from authenticator-value information and key base information, the authenticator-value information representing a specified authenticator value, the key base information containing identification information which is set to reproduce the specified authenticator value according to a predetermined degeneration function; encrypting at least the identification information in the key base information to convert the key base information into encryption-resultant key base information; and encrypting contents information into encryption-resultant contents information in response to the key signal. The method comprises the steps of decrypting the encryption-resultant key base information into the original key base information; reproducing the authenticator-value information representative of the specified authenticator value from the identification information in the original key base information according to the predetermined degeneration function; reproducing the key signal from the reproduced authenticator-value information and the original key base information; and decrypting the encryption-resultant contents information into the original contents information in response to the reproduced key signal.

A twenty-first aspect of this invention provides an apparatus for decrypting encryption-resultant contents information generated by an encrypting side which implements the steps of generating a signal representative of a key from authenticator-value information and key base information, the authenticator-value information representing a specified authenticator value, the key base information containing identification information which is set to reproduce the specified authenticator value according to a predetermined degeneration function; encrypting at least the identification information in the key base information to convert the key base information into encryption-resultant key base information; and encrypting contents information into encryption-resultant contents information in response to the key signal. The apparatus comprises means for decrypting the encryption-resultant key base information into the original key base information; means for reproducing the authenticator-value information representative of the specified authenticator value from the identification information in the original key base information according to the predetermined degeneration function; means for reproducing the key signal from the reproduced authenticator-value information and the original key base information; and means for decrypting the encryption-resultant contents information into the original contents information in response to the reproduced key signal.

A twenty-second aspect of this invention provides a method of decrypting encryption-resultant contents information generated by an encrypting side which implements the steps of generating a signal representative of a key from key base information containing identification information which is set to reproduce a specified authenticator value according to a predetermined degeneration function; and encrypting contents information into encryption-resultant contents information in response to the key signal. The method comprises the steps of reproducing the authenticator-value information representative of the specified authenticator value from the identification information in the key base information according to the predetermined degeneration function; reproducing the key signal from the key base information; deciding whether or not the reproduced authenticator-value information is correct; decrypting the encryption-resultant contents information in response to the reproduced key signal when it is decided that the reproduced authenticator-value information is correct; and altering the reproduced key signal into a wrong key signal and decrypting the encryption-resultant contents information in response to the wrong key signal when it is decided that the reproduced authenticator-value information is not correct.

A twenty-third aspect of this invention provides a method of decrypting encryption-resultant contents information generated by an encrypting side which implements the steps of generating a signal representative of a key from key base information containing identification information which is set to reproduce a specified authenticator value according to a predetermined degeneration function; encrypting at least the identification information in the key base information to convert the key base information into encryption-resultant key base information; and encrypting contents information into encryption-resultant contents information in response to the key signal. The method comprises the steps of decrypting the encryption-resultant key base information into the original key base information; reproducing the authenticator-value information representative of the specified authenticator value from the identification information in the original key base information according to the predetermined degeneration function; reproducing the key signal from the original key base information; deciding whether or not the reproduced authenticator-value information is correct; decrypting the encryption-resultant contents information in response to the reproduced key signal when it is decided that the reproduced authenticator-value information is correct; and altering the reproduced key signal into a wrong key signal and decrypting the encryption-resultant contents information in response to the wrong key signal when it is decided that the reproduced authenticator-value information is not correct.

A twenty-fourth aspect of this invention provides an apparatus for decrypting encryption-resultant contents information generated by an encrypting side which implements the steps of generating a signal representative of a key from key base information containing identification information which is set to reproduce a specified authenticator value according to a predetermined degeneration function; encrypting at least the identification information in the key base information to convert the key base information into encryption-resultant key base information; and encrypting contents information into encryption-resultant contents information in response to the key signal. The apparatus comprises means for decrypting the encryption-resultant key base information into the original key base information; means for reproducing the authenticator-value information representative of the specified authenticator value from the identification information in the original key base information according to the predetermined degeneration function; means for reproducing the key signal from the original key base information; means for deciding whether or not the reproduced authenticator-value information is correct; means for decrypting the encryption-resultant contents information in response to the reproduced key signal when it is decided that the reproduced authenticator-value information is correct; and means for altering the reproduced key signal into a wrong key signal and decrypting the encryption-resultant contents information in response to the wrong key signal when it is decided that the reproduced authenticator-value information is not correct.

A twenty-fifth aspect of this invention provides a method of decrypting encryption-resultant contents information generated by an encrypting side which implements the steps of generating a signal representative of a key from key base information containing identification information which is set to reproduce a specified authenticator value according to a predetermined degeneration function; and encrypting contents information into encryption-resultant contents information in response to the key signal. The method comprises the steps of reproducing the authenticator-value information representative of the specified authenticator value from the identification information in the key base information according to the predetermined degeneration function; reproducing the key signal from the key base information; deciding whether or not the reproduced authenticator-value information is correct; decrypting the encryption-resultant contents information in response to the reproduced key signal when it is decided that the reproduced authenticator-value information is correct; and failing to decrypt the encryption-resultant contents information in response to the reproduced key signal when it is decided that the reproduced authenticator-value information is not correct.

A twenty-sixth aspect of this invention provides a method of decrypting encryption-resultant contents information generated by an encrypting side which implements the steps of generating a signal representative of a key from key base information containing identification information which is set to reproduce a specified authenticator value according to a predetermined degeneration function; encrypting at least the identification information in the key base information to convert the key base information into encryption-resultant key base information; and encrypting contents information into encryption-resultant contents information in response to the key signal. The method comprises the steps of decrypting the encryption-resultant key base information into the original key base information; reproducing the authenticator-value information representative of the specified authenticator value from the identification information in the original key base information according to the predetermined degeneration function; reproducing the key signal from the original key base information; deciding whether or not the reproduced authenticator-value information is correct; decrypting the encryption-resultant contents information in response to the reproduced key signal when it is decided that the reproduced authenticator-value information is correct; and failing to decrypt the encryption-resultant contents information in response to the reproduced key signal when it is decided that the reproduced authenticator-value information is not correct.

A twenty-seventh aspect of this invention provides an apparatus for decrypting encryption-resultant contents information generated by an encrypting side which implements the steps of generating a signal representative of a key from key base information containing identification information which is set to reproduce a specified authenticator value according to a predetermined degeneration function; encrypting at least the identification information in the key base information to convert the key base information into encryption-resultant key base information; and encrypting contents information into encryption-resultant contents information in response to the key signal. The apparatus comprises means for decrypting the encryption-resultant key base information into the original key base information; means for reproducing the authenticator-value information representative of the specified authenticator value from the identification information in the original key base information according to the predetermined degeneration function; means for reproducing the key signal from the original key base information; means for deciding whether or not the reproduced authenticator-value information is correct; means for decrypting the encryption-resultant contents information in response to the reproduced key signal when it is decided that the reproduced authenticator-value information is correct; and means for failing to decrypt the encryption-resultant contents information in response to the reproduced key signal when it is decided that the reproduced authenticator-value information is not correct.

A twenty-eighth aspect of this invention is based on the nineteenth aspect thereof, and provides a method wherein the identification information in the key base information contains at least one of 1) information about a region or regions corresponding to one or more countries, one or more zones, or one or more spaces, 2) information about identification of an individual, 3) information about identification of a group of persons, 4) information about a rating, 5) information about identification of an apparatus maker or a device maker, 6) information about identification of a contents provider, 7) information about time, 8) information about contents authors, 9) information about identification of a reproducing apparatus or a reproducing device, 10) information about identification of a connection apparatus or a connection device, 11) information about identification of a medium on which contents information is recorded, 12) information about identification of contents information, and 13) information about accounting.

BRIEF DESCRIPTION OF THE DRAWINGS

FIG. 4 is a diagram of a calculator in a secondary section of the system in FIG. 1.

FIG. 5 is a diagram of a key generator in the secondary section of the system in FIG. 1.

DESCRIPTION OF THE PREFERRED EMBODIMENTS

First Embodiment

Figure 1:
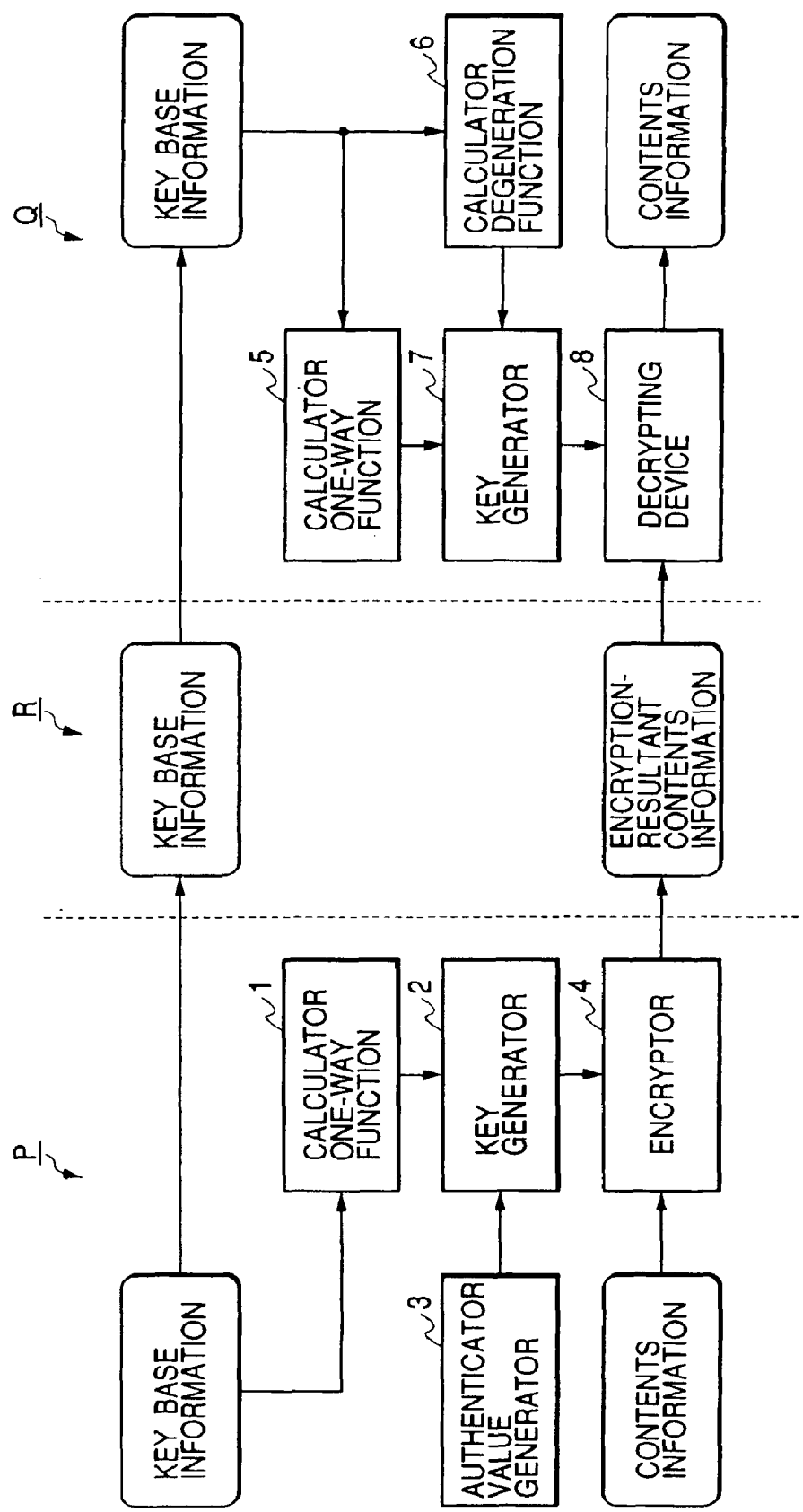
FIG. 1 is a block diagram of a system for contents information according to a first embodiment of this invention.

FIG. 1 shows a system for contents information according to a first embodiment of this invention. The system of FIG. 1 includes a primary section P, a secondary section Q, and an intermediate section R. The primary section P and the secondary section Q are connected to each other via the intermediate section R.

The primary section P includes an information recording apparatus or an information transmitting apparatus. The secondary section Q includes an information reproducing apparatus or an information receiving apparatus. An example of the information reproducing apparatus is an information player. The intermediate section R includes a recording medium or a transmission medium. Examples of the recording medium are a magnetic recording medium, an optical recording medium, and a semiconductor memory. Examples of the transmission medium are an optical fiber cable, electric wires, and a radio transmission line. The transmission medium is also referred to as a transmission line.

The primary section P includes a calculator or a key generator 1, a key generator 2, a signal generator 3, and an encryptor 4. The calculator 1 receives information being a base of a contents key. The key base information is fed from a suitable device (not shown). The calculator 1 generates a signal (information) representative of a primitive key from the key base information according to a predetermined one-way hash function. The calculator 1 outputs the primitive-key signal (the primitive-key information) to the key generator 2. The one-way hash function means a function "h" designed to meet conditions as follows. When a certain value "x" is given in a domain of definition, it is difficult to calculate a value "y" which satisfies the relation as "h(x)=h(y)".

Figure 2:
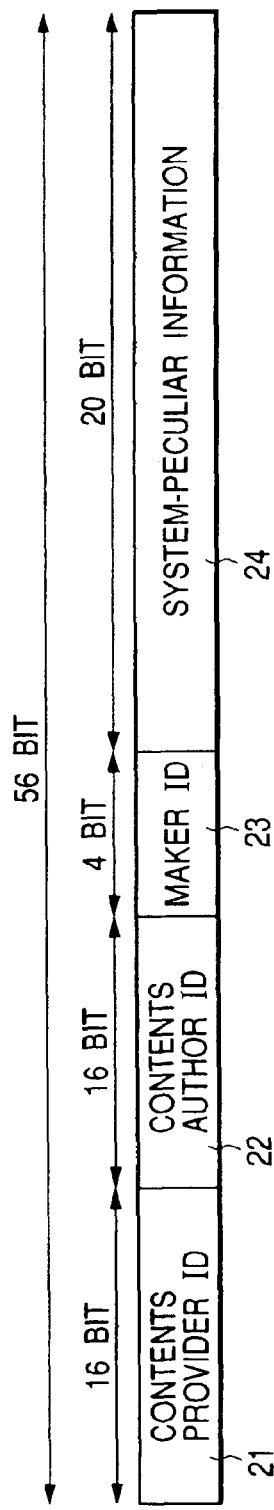
FIG. 2 is a diagram of the structure of key base information.

FIG. 2 shows an example of the structure of the key base information. The key base information in FIG. 2 has 56 bits divided into a first 16-bit block 21, a second 16-bit block 22, a 4-bit block 23, and a 20-bit block 24 which are sequentially arranged in that order. The first 16-bit block 21 represents identification (ID) information of a contents provider. The second 16-bit block 22 represents ID information of a contents author. The 4-bit block 23 represents ID information of a maker. The 20-bit block 24 represents information peculiar to the system.

The signal generator 3 in FIG. 1 outputs information representative of a predetermined or specified authenticator value to the key generator 2. The signal generator 3 includes, for example, a memory loaded with the authenticator-value information or a CPU programmed to generate the authenticator-value information.

The 16-bit contents provider ID information, the 16-bit contents author ID information, and the 4-bit maker ID information in the key base information are set so that the predetermined authenticator value (the specified authenticator value) can be generated or reproduced by the secondary section Q according to a predetermined degeneration function. Specifically, the secondary section Q uses the 16-bit contents provider ID information, the 16-bit contents author ID information, and the 4-bit maker ID information in the transmitted and received key base information as parameters of the predetermined degeneration function for recovering the predetermined authenticator value. Correct values of the 16-bit contents provider ID information, the 16-bit contents author ID information, and the 4-bit maker ID information are open only to a legitimate user. The correct contents provider ID information, the correct contents author ID information, and the correct maker ID information are referred to as authorized or permitted ID information.

The key generator 2 produces a signal (information) representative of the contents key in response to the primitive-key information and the authenticator-value information according to a predetermined function. The key generator 2 outputs the contents-key signal (the contents-key information) to the encryptor 4.

Figure 3:
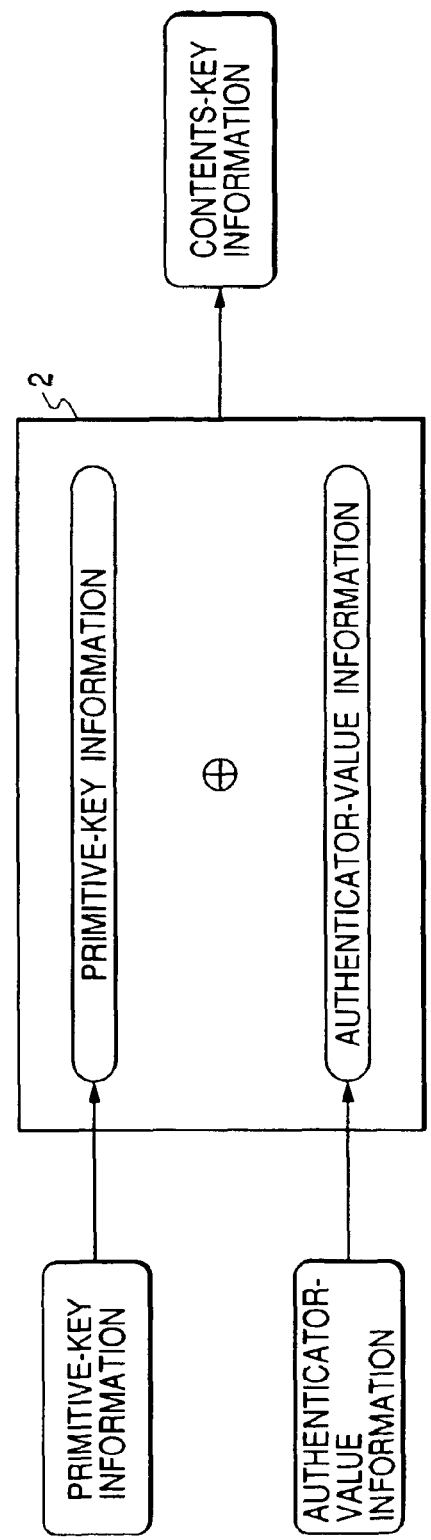
FIG. 3 is a diagram of a key generator in a primary section of the system in FIG. 1.

FIG. 3 shows an example of the key generator 2. The key generator 2 in FIG. 3 executes Exclusive-OR operation between the primitive-key information and the authenticator-value information. The key generator 2 outputs a signal representative of the result of Exclusive-OR operation as the contents-key information. In this case, Exclusive-OR operation corresponds to the predetermined function used by the key generator 2.

The encryptor 4 receives contents information from a suitable device (not shown). The device 4 encrypts the contents information into encryption-resultant contents information in response to the contents-key signal. The encryptor 4 outputs the encryption-resultant contents information to the intermediate section R.

Specifically, the primary section P records the encryption-resultant contents information on the recording medium of the intermediate section R, or transmits the encryption-resultant contents information to the transmission line of the intermediate section R.

The encryptor 4 may additionally include a compressor. In this case, the compressor compresses the contents information, and then the encryptor 4 encrypts the compression-resultant contents information. The compression of the contents information is executed in a predetermined compressing method such as an MPEG (Moving Picture Experts Group) compressing method. It should be noted that compression-resultant contents information may be fed to the encryptor 4 from an external device (not shown). In this case, the compressor is omitted from the encryptor 4.

The encryption by the encryptor 4 may be based on a known encryption algorithm such as DES (Data Encryption Standard). According to DES, the contents information is encrypted and decrypted 64 bits by 64 bits in response to the contents-key signal. In this case, the contents-key signal corresponds to a 56-bit signal representing a common key. The encryption by the encryptor 4 includes a step of dividing every 64-bit block of the contents information (or the compression-resultant contents information) into a pair of 32-bit sub blocks. The encryption includes additional steps for signal processing on a sub-block by sub-block basis. The additional steps contain a step of transposing data, a step of executing permutation of data, a step of processing data according to a nonlinear function, and a step of executing Exclusive-OR operation between data.

The primary section P outputs the key base information to the intermediate section R. Specifically, the primary section P records the key base information on the recording medium of the intermediate section R, or transmits the key base information to the transmission line of the intermediate section R.

The primary section P may further include a second encryptor. In this case, the second encryptor encrypts at least part of the key base information to generate encryption-resultant key base information. For example, the second encryptor encrypts at least the 16-bit contents provider ID information, the 16-bit contents author ID information, and the 4-bit maker ID information in the key base information. The second encryptor outputs the encryption-resultant key base information to the intermediate section R. Specifically, in this case, the primary section P records the encryption-resultant key base information on the recording medium of the intermediate section R, or transmits the encryption-resultant key base information to the transmission line of the intermediate section R.

The encryption-resultant contents information and the key base information (or the encryption-resultant key base information) are transmitted from the primary section P to the secondary section Q through the intermediate section R.

The secondary section Q includes a calculator or a key generator 5, a calculator 6, a key generator 7, and a decrypting device 8. The calculator 5 is similar in design and operation to the calculator 1 of the primary section P. The calculator 5 receives the key base information from the intermediate section R. The calculator 5 generates a signal (information) representative of a primitive key from the key base information according to a predetermined one-way hash function equivalent to that used by the calculator 1 in the primary section P. The calculator 5 outputs the primitive-key signal (the primitive-key information) to the key generator 7.

The calculator 6 receives the key base information from the intermediate section R. The calculator 6 generates information representative of a predetermined or specified authenticator value from the 16-bit contents provider ID information, the 16-bit contents author ID information, and the 4-bit maker ID information in the key base information according to a predetermined degeneration function. The authenticator value generated by the calculator 6 is equal to that used in the primary section P. Thus, the calculator 6 reproduces the authenticator value used in the primary section P. Preferably, the degeneration function used by the calculator 6 differs from the one-way hash function used by the calculator 5. The degeneration function used by the calculator 6 may be the same as the one-way hash function used by the calculator 5. Correct information of the degeneration function used by the calculator 6 is open only to a legitimate user. The calculator 6 outputs the authenticator-value information to the key generator 7.

FIG. 4 shows an example of the calculator 6. The calculator 6 in FIG. 4 extracts the 16-bit contents provider ID information, the 16-bit contents author ID information, and the 4-bit maker ID information from the key base information. The calculator 6 executes Exclusive-OR operation among the 16-bit contents provider ID information, the 16-bit contents author ID information, and the 4-bit maker ID information. The calculator 6 outputs information representative of the result of Exclusive-OR operation as the authenticator-value information. The authenticator-value information is also referred to as the degeneration information. In this case, Exclusive-OR operation corresponds to the degeneration function, and the 16-bit contents provider ID information, the 16-bit contents author ID information, and the 4-bit maker ID information are used as parameters of the degeneration function.

The second section Q may further include a second decrypting device. In this case, the second decrypting device receives the encryption-resultant key base information from the intermediate section R. The second decrypting device decrypts the encryption-resultant key base information into the original key base information. The second decrypting device outputs the original key base information to the calculators 5 and 6.

The key generator 7 is similar in design and operation to the key generator 2 of the primary section P. The key generator 7 produces a signal (information) representative of a contents key in response to the primitive-key information and the authenticator-value information (the degeneration information) according to a predetermined function equivalent to that used by the key generator 2 in the primary section P. Thus, the key generator 7 reproduces the contents-key signal used in the primary section P. The key generator 7 outputs the contents-key signal (the contents-key information) to the decrypting device 8.

FIG. 5 shows an example of the key generator 7. The key generator 7 in FIG. 5 executes Exclusive-OR operation between the primitive-key information and the authenticator-value information (the degeneration information). The key generator 7 outputs a signal representative of the result of Exclusive-OR operation as the contents-key information. In this case, Exclusive-OR operation corresponds to the predetermined function used by the key generator 7.

The decrypting device 8 receives the encryption-resultant contents information from the intermediate section R. Operation of the decrypting device 8 is inverse with respect to that of the encryptor 4 in the primary section P. The decrypting device 8 decrypts the encryption-resultant contents information into the original contents information in response to the contents-key signal. Thus, the decrypting device 8 reproduces the original contents information. The decrypting device 8 outputs the reproduced contents information.

In the system of FIG. 1, the 16-bit contents provider ID information, the 16-bit contents author ID information, and the 4-bit maker ID information in the key base information are set so that the predetermined authenticator value (the specified authenticator value) can be generated according to the predetermined degeneration function. The generated authenticator value is used to reproduce the contents key for decrypting the encryption-resultant contents information. Correct values of the 16-bit contents provider ID information, the 16-bit contents author ID information, and the 4-bit maker ID information are open only to a legitimate user. It is difficult to generate the predetermined authenticator value by using wrong values of the 16-bit contents provider ID information, the 16-bit contents author ID information, and the 4-bit maker ID information. Therefore, it is difficult to decrypt the encryption-resultant contents information by using wrong values of the 16-bit contents provider ID information, the 16-bit contents author ID information, and the 4-bit maker ID information. Correct information of the predetermined degeneration function is open only to a legitimate user. It is difficult to generate the predetermined authentication value by using wrong information of the predetermined degeneration function. Therefore, it is difficult to decrypt the encryption-resultant contents information by using wrong information of the predetermined degeneration function. As understood from the above description, the encryption-resultant contents information is decrypted only when correct values of the 16-bit contents provider ID information, the 16-bit contents author ID information, and the 4-bit maker ID information, and also correct information of the predetermined degeneration function are available. Accordingly, the contents information can be surely prevented from being illegally reproduced or copied.

The 16-bit contents provider ID information, the 16-bit contents author ID information, and the 4-bit maker ID information in the key base information may be replaced by at least one of 1) information about a region or regions corresponding to one or more countries, one or more zones, or one or more spaces, 2) information about identification of an individual, 3) information about identification of a group of persons, 4) information about a rating, 5) information about identification of an apparatus maker or a device maker, 6) information about identification of a contents provider, 7) information about time, 8) information about contents authors, 9) information about identification of a reproducing apparatus or a reproducing device, 10) information about identification of a connection apparatus or a connection device, 11) information about identification of a medium on which contents information is recorded, 12) information about identification of contents information, and 13) information about accounting.

Second Embodiment

Figure 6:
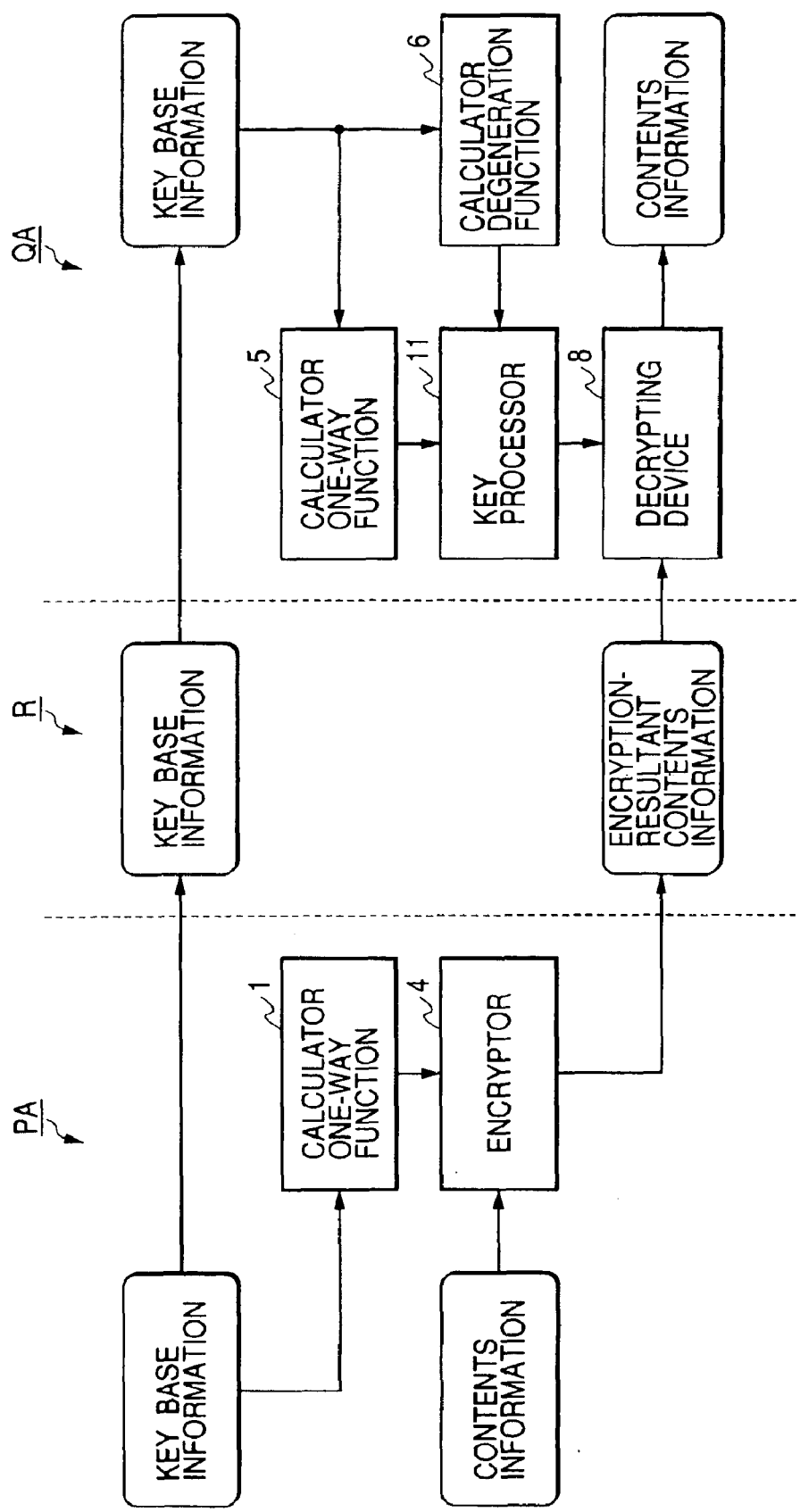
FIG. 6 is a block diagram of a system for contents information according to a second embodiment of this invention.

FIG. 6 shows a system for contents information according to a second embodiment of this invention. The system of FIG. 6 is similar to the system of FIG. 1 except for design changes mentioned hereinafter. The system of FIG. 6 includes a primary section PA and a secondary section QA instead of the primary section P and the secondary section Q (see FIG. 1) respectively.

The primary section PA is similar to the primary section P except that the key generator 2 and the signal generator 3 (see FIG. 1) are omitted therefrom. In the primary section PA, the calculator (the key generator) 1 and the encryptor 4 are directly connected to each other.

The secondary section QA is similar to the secondary section Q except that a key processor 11 replaces the key generator 7 (see FIG. 1).

In the primary section PA, the calculator 1 generates a signal (information) representative of a primitive key from the key base information according to a predetermined one-way hash function. The calculator 1 outputs the primitive-key signal (the primitive-key information) to the encryptor 4.

As shown in FIG. 2, an example of the key base information has the 16-bit contents provider ID information, the 16-bit contents author ID information, the 4-bit maker ID information, and the 20-bit system-peculiar information.

The 16-bit contents provider ID information, the 16-bit contents author ID information, and the 4-bit maker ID information in the key base information are set so that a predetermined or specified authenticator value can be generated by the secondary section QA according to a predetermined degeneration function. Specifically, the secondary section QA uses the 16-bit contents provider ID information, the 16-bit contents author ID information, and the 4-bit maker ID information in the transmitted and received key base information as parameters of the predetermined degeneration function for recovering the predetermined authenticator value. Correct values of the 16-bit contents provider ID information, the 16-bit contents author ID information, and the 4-bit maker ID information are open only to a legitimate user.

The encryptor 4 receives contents information from a suitable device (not shown). The encryptor 4 uses the primitive-key signal as a signal (information) representative of a contents key. The device 4 encrypts the contents information into encryption-resultant contents information in response to the contents-key signal. The encryption by the encryptor 4 may be based on a known encryption algorithm such as DES. The encryptor 4 outputs the encryption-resultant contents information to the intermediate section R.

Specifically, the primary section PA records the encryption-resultant contents information on the recording medium of the intermediate section R, or transmits the encryption-resultant contents information to the transmission line of the intermediate section R.

The primary section PA outputs the key base information to the intermediate section R. Specifically, the primary section PA records the key base information on the recording medium of the intermediate section R, or transmits the key base information to the transmission line of the intermediate section R.

The primary section PA may further include a second encryptor. In this case, the second encryptor encrypts at least part of the key base information to generate encryption-resultant key base information. For example, the second encryptor encrypts at least the 16-bit contents provider ID information, the 16-bit contents author ID information, and the 4-bit maker ID information in the key base information. The second encryptor outputs the encryption-resultant key base information to the intermediate section R. Specifically, in this case, the primary section PA records the encryption-resultant key base information on the recording medium of the intermediate section R, or transmits the encryption-resultant key base information to the transmission line of the intermediate section R.

The encryption-resultant contents information and the key base information (or the encryption-resultant key base information) are transmitted from the primary section PA to the secondary section QA through the intermediate section R.

In the secondary section QA, the key processor 11 receives the primitive-key signal (the primitive-key information) from the calculator 5. In addition, the key processor 11 receives the authenticator-value information from the calculator 6. The key processor 11 decides whether or not the authenticator value represented by the information from the calculator 6 is correct. When the authenticator value is correct, the key processor 11 passes the primitive-key signal to the decrypting device 8 as it is. When the authenticator value is not correct, the key processor 11 alters or processes the primitive-key signal into a wrong primitive-key signal and outputs the wrong primitive-key signal to the decrypting device 8.

For example, the key processor 11 includes a memory, a comparator, and a signal converter. The memory stores data representative of a correct authenticator value. The memory informs the comparator of the correct authenticator value. The comparator receives the authenticator-value information from the calculator 6. The comparator decides whether the authenticator value represented by the information from the calculator 6 is equal to or different from the correct authenticator value. The comparator informs the signal converter of the result of the decision. The signal converter receives the primitive-key information from the calculator 5. The signal converter is followed by the decrypting device 8. When the result of the decision indicates that the authenticator value represented by the information from the calculator 6 is equal to the correct authenticator value, the signal converter falls into a through state. Thus, in this case, the signal converter passes the primitive-key information to the decrypting device 8 as it is. When the result of the decision indicates that the authenticator value represented by the information from the calculator 6 is different from the correct authenticator value, the signal converter falls into an active state. Thus, in this case, the signal converter alters or processes the primitive-key information into the wrong primitive-key signal and outputs the wrong primitive-key signal to the decrypting device 8.

The decrypting device 8 receives the encryption-resultant contents information from the intermediate section R. The decrypting device 8 uses the primitive-key signal as a signal (information) representative of a contents key. Operation of the decrypting device 8 is inverse with respect to that of the encryptor 4 in the primary section PA. The decrypting device 8 decrypts the encryption-resultant contents information into the original contents information in response to the contents-key signal. Thus, the decrypting device 8 reproduces the original contents information. The decrypting device 8 outputs the reproduced contents information.

In the system of FIG. 6, the correct contents-key signal can be fed to the decrypting device 8 only when the reproduced authenticator-value information is correct. The correct contents-key signal enables the decrypting device 8 to accurately reproduce the original contents information. On the other hand, a wrong contents-key signal is fed to the decrypting device 8 when the reproduced authentication-value information is wrong. The wrong contents-key signal makes it difficult for the decrypting device 8 to accurately reproduce the original contents information. Accordingly, the contents information can be surely prevented from being illegally reproduced or copied.

The 16-bit contents provider ID information, the 16-bit contents author ID information, and the 4-bit maker ID information in the key base information may be replaced by at least one of 1) information about a region or regions corresponding to one or more countries, one or more zones, or one or more spaces, 2) information about identification of an individual, 3) information about identification of a group of persons, 4) information about a rating, 5) information about identification of an apparatus maker or a device maker, 6) information about identification of a contents provider, 7) information about time, 8) information about contents authors, 9) information about identification of a reproducing apparatus or a reproducing device, 10) information about identification of a connection apparatus or a connection device, 11) information about identification of a medium on which contents information is recorded, 12) information about identification of contents information, and 13) information about accounting.

Third Embodiment

Figure 7:
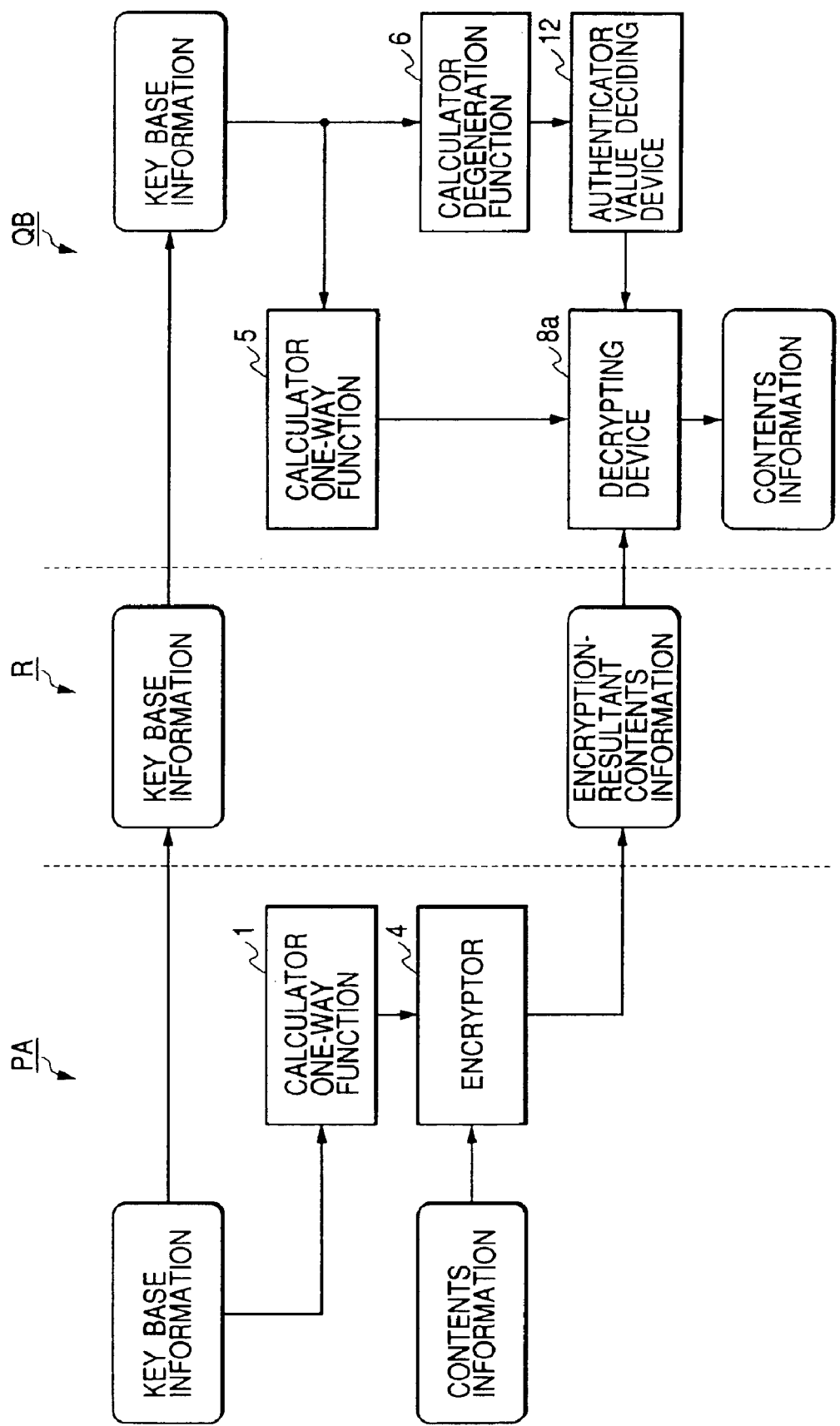
FIG. 7 is a block diagram of a system for contents information according to a third embodiment of this invention.

FIG. 7 shows a system for contents information according to a third embodiment of this invention. The system of FIG. 7 is similar to the system of FIG. 6 except for design changes mentioned hereinafter. The system of FIG. 7 includes a secondary section QB instead of the secondary section QA (see FIG. 6).

The secondary section QB includes a decrypting device 8a instead of the decrypting device 8 (see FIG. 6). The decrypting device 8a is directly connected to the calculator 5. The secondary section QB includes a deciding device 12 connected between the calculator 6 and the decrypting device 8a.

The deciding device 12 receives the authenticator-value information from the calculator 6. The deciding device 12 decides whether or not the authenticator-value information is correct, that is, whether or not the authenticator value represented by the information from the calculator 6 is correct. The deciding device 12 informs the decrypting device 8a of the result of the decision.

For example, the deciding device 12 includes a memory and a comparator. The memory stores data representative of a correct authenticator value. The memory informs the comparator of the correct authenticator value. The comparator receives the authenticator-value information from the calculator 6. The comparator decides whether the authenticator value represented by the information from the calculator 6 is equal to or different from the correct authenticator value. The comparator is connected to the decrypting device 8a. The comparator informs the decrypting device 8a of the result of the decision.

The decrypting device 8a receives the primitive-key signal from the calculator 5 as a signal (information) representative of a contents key. The decrypting device 8a receives the encryption-resultant contents information from the intermediate section R. The decrypting device 8a is selectively enabled and disabled in response to the decision result fed from the deciding device 12. When the decision result indicates that the authenticator-value information is correct, the decrypting device 8a is enabled. Thus, in this case, the decrypting device 8a decrypts the encryption-resultant contents information into the original contents information in response to the contents-key signal. In other words, the decrypting device 8a reproduces the original contents information. The decrypting device 8a outputs the reproduced contents information. When the decision result indicates that the authenticator-value information is not correct, the decrypting device 8a is disabled. Thus, in this case, the decrypting device 8a fails to decrypt the encryption-resultant contents information. Accordingly, the contents information can be surely prevented from being illegally reproduced or copied.

Fourth Embodiment

Figure 8:
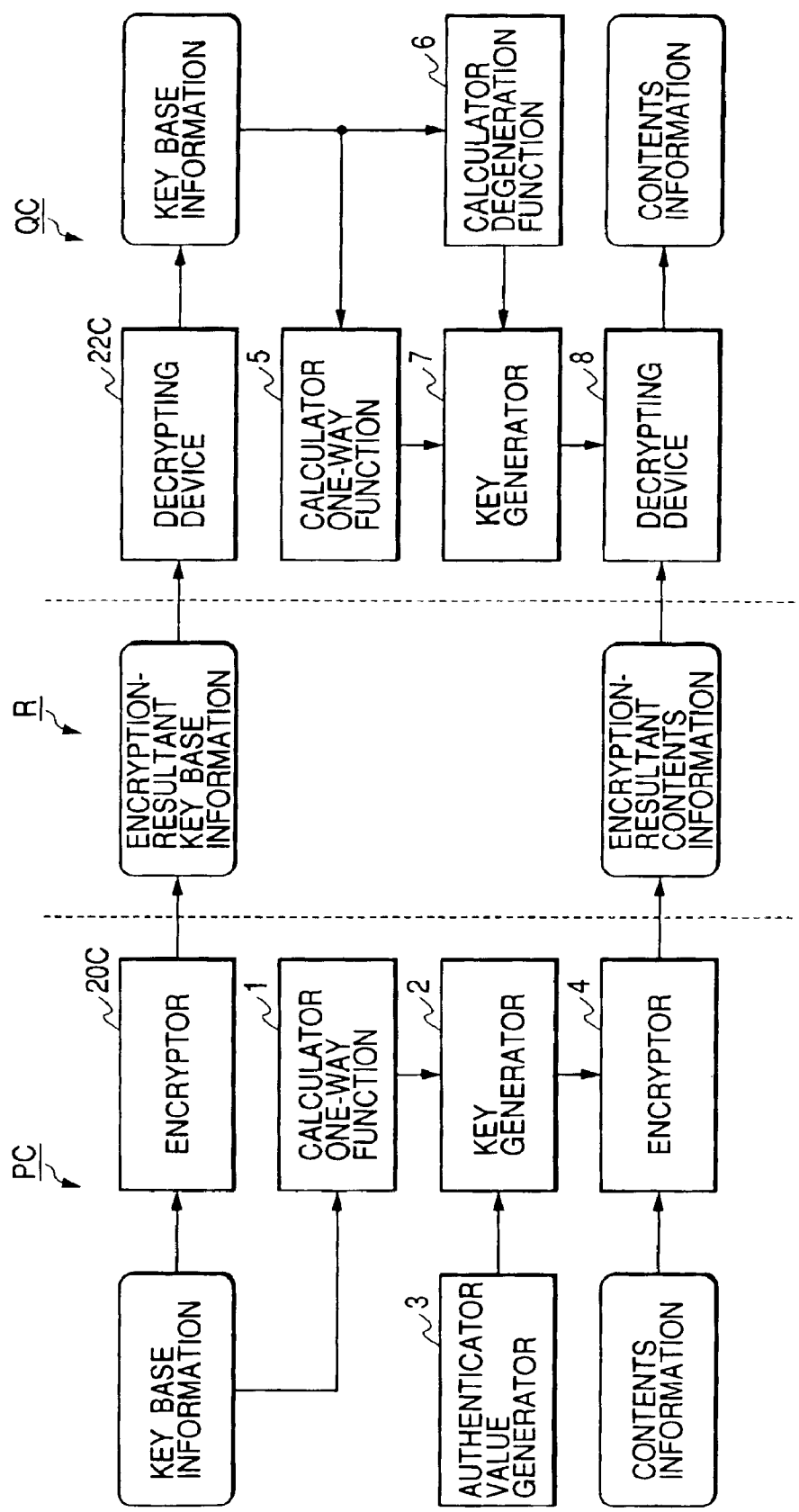
FIG. 8 is a block diagram of a system for contents information according to a fourth embodiment of this invention.

FIG. 8 shows a system for contents information according to a fourth embodiment of this invention. The system of FIG. 8 is similar to the system of FIG. 1 except for design changes mentioned hereinafter. The system of FIG. 8 includes a primary section PC and a secondary section QC instead of the primary section P and the secondary section Q (see FIG. 1) respectively.

The primary section PC is similar to the primary section P (see FIG. 1) except that an encryptor 20C is additionally provided. The encryptor 20C receives the key base information. The device 20C encrypts at least part of the key base information to generate encryption-resultant key base information. For example, the device 20C encrypts at least the 16-bit contents provider ID information, the 16-bit contents author ID information, and the 4-bit maker ID information in the key base information. The encryptor 20C outputs the encryption-resultant key base information to the intermediate section R. Specifically, in this case, the primary section PC records the encryption-resultant key base information on the recording medium of the intermediate section R, or transmits the encryption-resultant key base information to the transmission line of the intermediate section R.

The encryption-resultant contents information and the encryption-resultant key base information are transmitted from the primary section PC to the secondary section QC through the intermediate section R.

The secondary section QC is similar to the secondary section Q (see FIG. 1) except that a decrypting device 22C is additionally provided. The decrypting device 22C receives the encryption-resultant key base information from the intermediate section R. The decrypting device 22C decrypts the encryption-resultant key base information into the original key base information. The decrypting device 22C outputs the original key base information to the calculators 5 and 6.

Fifth Embodiment

Figure 9:
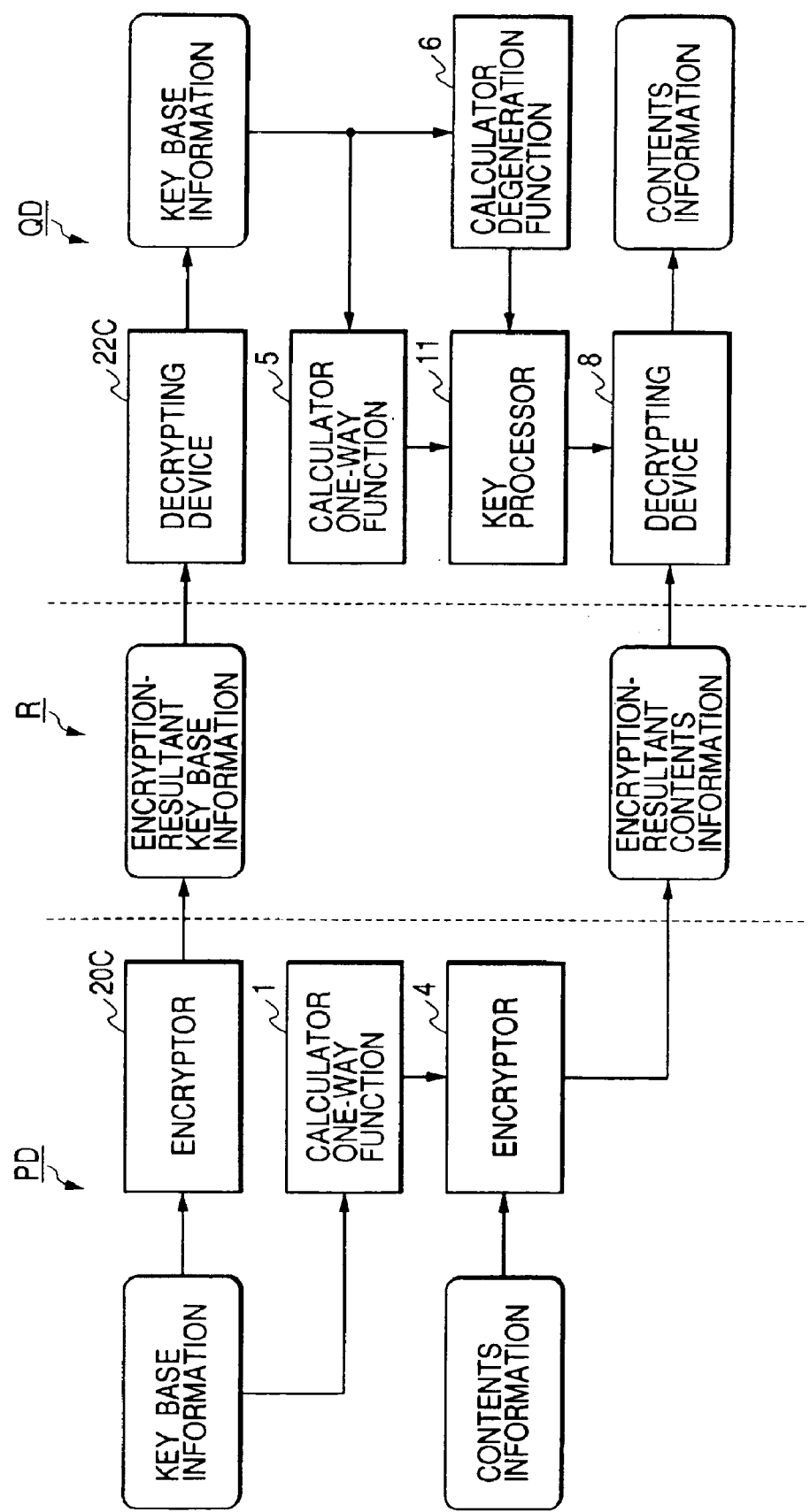
FIG. 9 is a block diagram of a system for contents information according to a fifth embodiment of this invention.

FIG. 9 shows a system for contents information according to a fifth embodiment of this invention. The system of FIG. 9 is similar to the system of FIG. 6 except for design changes mentioned hereinafter. The system of FIG. 9 includes a primary section PD and a secondary section QD instead of the primary section PA and the secondary section QA (see FIG. 6) respectively.

The primary section PD is similar to the primary section PA (see FIG. 6) except that an encryptor 20C is additionally provided. The encryptor 20C receives the key base information. The device 20C encrypts at least part of the key base information to generate encryption-resultant key base information. For example, the device 20C encrypts at least the 16-bit contents provider ID information, the 16-bit contents author ID information, and the 4-bit maker ID information in the key base information. The encryptor 20C outputs the encryption-resultant key base information to the intermediate section R. Specifically, in this case, the primary section PD records the encryption-resultant key base information on the recording medium of the intermediate section R, or transmits the encryption-resultant key base information to the transmission line of the intermediate section R.

The encryption-resultant contents information and the encryption-resultant key base information are transmitted from the primary section PD to the secondary section QD through the intermediate section R.

The secondary section QD is similar to the secondary section QA (see FIG. 6) except that a decrypting device 22C is additionally provided. The decrypting device 22C receives the encryption-resultant key base information from the intermediate section R. The decrypting device 22C decrypts the encryption-resultant key base information into the original key base information. The decrypting device 22C outputs the original key base information to the calculators 5 and 6.

Sixth Embodiment

Figure 10:
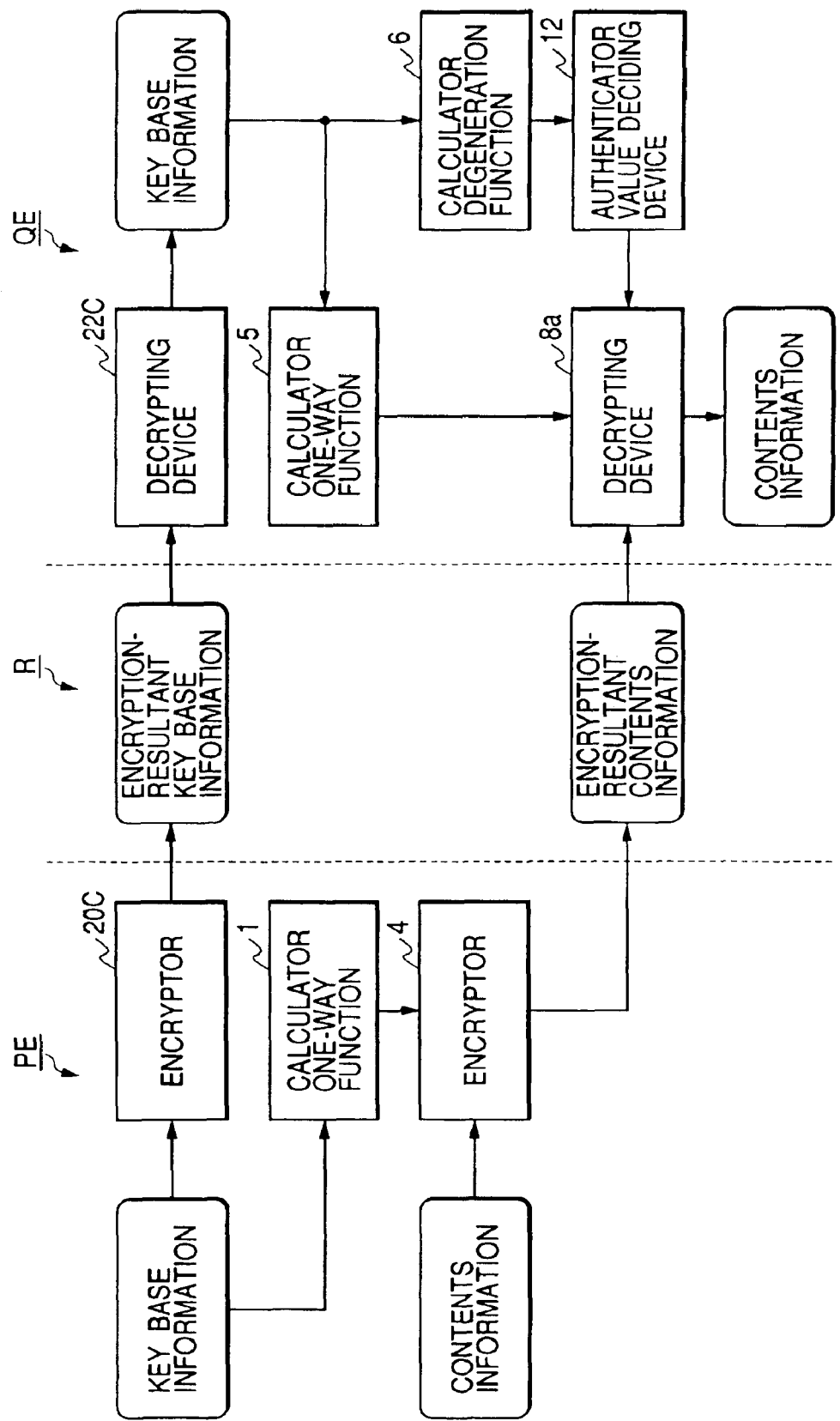
FIG. 10 is a block diagram of a system for contents information according to a sixth embodiment of this invention.

FIG. 10 shows a system for contents information according to a sixth embodiment of this invention. The system of FIG. 10 is similar to the system of FIG. 7 except for design changes mentioned hereinafter. The system of FIG. 10 includes a primary section PE and a secondary section QE instead of the primary section PA and the secondary section QB (see FIG. 7) respectively.

The primary section PE is similar to the primary section PA (see FIG. 7) except that an encryptor 20C is additionally provided. The encryptor 20C receives the key base information. The device 20C encrypts at least part of the key base information to generate encryption-resultant key base information. For example, the device 20C encrypts at least the 16-bit contents provider ID information, the 16-bit contents author ID information, and the 4-bit maker ID information in the key base information. The encryptor 20C outputs the encryption-resultant key base information to the intermediate section R. Specifically, in this case, the primary section PE records the encryption-resultant key base information on the recording medium of the intermediate section R, or transmits the encryption-resultant key base information to the transmission line of the intermediate section R.

The encryption-resultant contents information and the encryption-resultant key base information are transmitted from the primary section PE to the secondary section QE through the intermediate section R.

The secondary section QE is similar to the secondary section QB (see FIG. 7) except that a decrypting device 22C is additionally provided. The decrypting device 22C receives the encryption-resultant key base information from the intermediate section R. The decrypting device 22C decrypts the encryption-resultant key base information into the original key base information. The decrypting device 22C outputs the original key base information to the calculators 5 and 6.

What is claimed is:

1. A method of recording contents information, comprising the steps of:
    generating a signal representative of a key from authenticator-value information and key base information, the authenticator-value information representing a specified authenticator value, the key base information containing identification information which is set to reproduce the specified authenticator value according to a predetermined degeneration function;
    encrypting at least the identification information in the key base information to convert the key base information into encryption-resultant key base information;
    encrypting contents information into encryption-resultant contents information in response to the key signal; and
    recording the encryption-resultant key base information and the encryption-resultant contents information;
    wherein the identification information in the key base information contains at least one of 1) information about a region or regions corresponding to one or more countries, one or more zones, or one or more spaces, 2) information about identification of an individual, 3) information about identification of a group of persons, 4) information about a rating, 5) information about identification of an apparatus maker or a device maker, 6) information about identification of a contents provider, 7) information about time, 8) information about contents authors, 9) information about identification of a reproducing apparatus or a reproducing device, 10) information about identification of a connection apparatus or a connection device, 11) information about identification of a medium on which contents information is recorded, 12) information about identification of contents information, and 13) information about accounting.

2. A transmission medium for transmitting encryption-resultant key base information and encryption-resultant contents information, wherein the encryption-resultant key base information and the encryption-resultant contents information are generated by the steps of generating a signal representative of a key from authenticator-value information and key base information, the authenticator-value information representing a specified authenticator value, the key base information containing identification information which is set to reproduce the specified authenticator value according to a predetermined degeneration function; encrypting at least the identification information in the key base information to convert the key base information into encryption-resultant key base information; and encrypting contents information into encryption-resultant contents information in response to the key signal.

3. A recording medium loaded with encryption-resultant key base information and encryption-resultant contents information, wherein the encryption-resultant key base information and the encryption-resultant contents information are generated by the steps of generating a signal representative of a key from authenticator-value information and key base information, the authenticator-value information representing a specified authenticator value, the key base information containing identification information which is set to reproduce the specified authenticator value according to a predetermined degeneration function; encrypting at least the identification information in the key base information to convert the key base information into encryption-resultant key base information; and encrypting contents information into encryption-resultant contents information in response to the key signal.

4. A method of transmitting contents information comprising the steps of:
    generating a signal representative of a key from authenticator-value information and key base information, the authenticator-value information representing a specified authenticator value, the key base information containing identification information which is set to reproduce the specified authenticator value according to a predetermined degeneration function:
    encrypting at least the identification information in the key base information to convert the key base information into encryption-resultant key base information:
    encrypting contents information into encryption-resultant contents information in response to the key signal: and
    transmitting the encryption-resultant key base information and the encryption-resultant contents information:
    wherein the identification information in the key base information contains at least one of 1) information about a region or regions corresponding to one or more countries, one or more zones, or one or more spaces, 2) information about identification of an individual, 3) information about identification of a group of persons, 4) information about a rating, 5) information about identification of an apparatus maker or a device maker, 6) information about identification of a contents provider, 7) information about time, 8) information about contents authors, 9) information about identification of a reproducing apparatus or a reproducing device, 10) information about identification of a connection apparatus or a connection device, 11) information about identification of a medium on which contents information is recorded, 12) information about identification of contents information, and 13) information about accounting.

5. A method of recording contents information, comprising the steps of:
    generating a signal representative of a key from key base information containing identification information which is set to reproduce a specified authenticator value according to a predetermined degeneration function;

encrypting at least the identification information in the key base information to convert the key base information into encryption-resultant key base information;

encrypting contents information into encryption-resultant contents information in response to the key signal; and recording the encryption-resultant key base information and the encryption-resultant contents information;

wherein the identification information in the key base information contains at least one of 1) information about a region or regions corresponding to one or more countries, one or more zones, or one or more spaces, 2) information about identification of an individual, 3) information about identification of a group of persons, 4) information about a rating, 5) information about identification of an apparatus maker or a device maker, 6) information about identification of a contents provider, 7) information about time, 8) information about contents authors, 9) information about identification of a reproducing apparatus or a reproducing device, 10) information about identification of a connection apparatus or a connection device, 11) information about identification of a medium on which contents information is recorded, 12) information about identification of contents information, and 13) information about accounting.

6. An apparatus for transmitting contents information, comprising:

means for generating a signal representative of a key from key base information containing identification information which is set to reproduce a specified authenticator value according to a predetermined degeneration function;

means for encrypting at least the identification information in the key base information to convert the key base information into encryption-resultant key base information;

means for encrypting contents information into encryption-resultant contents information in response to the key signal; and means for transmitting the encryption-resultant key base information and the encryption-resultant contents information;

wherein the identification information in the key base information contains at least one of 1) information about a region or regions corresponding to one or more countries, one or more zones, or one or more spaces, 2) information about identification of an individual, 3) information about identification of a group of persons, 4) information about a rating, 5) information about identification of an apparatus maker or a device maker, 6) information about identification of a contents provider, 7) information about time, 8) information about contents authors, 9) information about identification of a reproducing apparatus or a reproducing device, 10) information about identification of a connection apparatus or a connection device, 11) information about identification of a medium on which contents information is recorded, 12) information about identification of contents information, and 13) information about accounting.

7. An apparatus for recording contents information, comprising:

means for generating a signal representative of a key from key base information containing identification information which is set to reproduce a specified authenticator value according to a predetermined degeneration function;

means for encrypting at least the identification information in the key base information to convert the key base information into encryption-resultant key base information;

means for encrypting contents information into encryption-resultant contents information in response to the key signal; and means for recording the encryption-resultant key base information and the encryption-resultant contents information;

wherein the identification information in the key base information contains at least one of 1) information about a region or regions corresponding to one or more countries, one or more zones, or one or more spaces, 2) information about identification of an individual, 3) information about identification of a group of persons, 4) information about a rating, 5) information about identification of an apparatus maker or a device maker, 6) information about identification of a contents provider, 7) information about time, 8) information about contents authors, 9) information about identification of a reproducing apparatus or a reproducing device, 10) information about identification of a connection apparatus or a connection device, 11) information about identification of a medium on which contents information is recorded, 12) information about identification of contents information, and 13) information about accounting.

8. A transmission medium for transmitting encryption-resultant key base information and encryption-resultant contents information, wherein the encryption-resultant key base information and the encryption-resultant contents information are generated by the steps of generating a signal representative of a key from key base information containing identification information which is set to reproduce a specified authenticator value according to a predetermined degeneration function; encrypting at least the identification information in the key base information to convert the key base information into encryption-resultant key base information; and encrypting contents information into encryption-resultant contents information in response to the key signal.

9. A recording medium loaded with encryption-resultant key base information and encryption-resultant contents information, wherein the encryption-resultant key base information and the encryption-resultant contents information are generated by the steps of generating a signal representative of a key from key base information containing identification information which is set to reproduce a specified authenticator value according to a predetermined degeneration function; encrypting at least the identification information in the key base information to convert the key base information into encryption-resultant key base information; and encrypting contents information into encryption-resultant contents information in response to the key signal.

10. A method of transmitting contents information, comprising the steps of:

generating a signal representative of a key from key base information containing identification information which is set to reproduce a specified authenticator value according to a predetermined degeneration function;

encrypting at least the identification information in the key base information to convert the key base information into encryption-resultant key base information;

encrypting contents information into encryption-resultant contents information in response to the key signal; and transmitting the encryption-resultant key base information and the encryption-resultant contents information;

wherein the identification information in the key base information contains at least one of 1) information about a region or regions corresponding to one or more countries, one or more zones, or one or more spaces, 2) information about identification of an individual, 3) information about identification of a group of persons, 4) information about a rating, 5) information about identification of an apparatus maker or a device maker, 6) information about identification of a contents provider, 7) information about time, 8) information about contents authors, 9) information about identification of a reproducing apparatus or a reproducing device, 10) information about identification of a connection apparatus or a connection device, 11) information about identification of a medium on which contents information is recorded, 12) information about identification of contents information, and 13) information about accounting.

11. A method of decrypting encryption-resultant contents information generated by an encrypting side which implements the steps of generating a signal representative of a key from authenticator-value information and key base information, the authenticator-value information representing a specified authenticator value, the key base information containing identification information which is set to reproduce the specified authenticator value according to a predetermined degeneration function; and encrypting contents information into encryption-resultant contents information in response to the key signal; the method comprising the steps of:

reproducing the authenticator-value information representative of the specified authenticator value from the identification information in the key base information according to the predetermined degeneration function;

reproducing the key signal from the reproduced authenticator-value information and the key base information; and decrypting the encryption-resultant contents information into the original contents information in response to the reproduced key signal.

12. A method as recited in claim 11, wherein the identification information in the key base information contains at least one of 1) information about a region or regions corresponding to one or more countries, one or more zones, or one or more spaces, 2) information about identification of an individual, 3) information about identification of a group of persons, 4) information about a rating, 5) information about identification of an apparatus maker or a device maker, 6) information about identification of a contents provider, 7) information about time, 8) information about contents authors, 9) information about identification of a reproducing apparatus or a reproducing device, 10) information about identification of a connection apparatus or a connection device, 11) information about identification of a medium on which contents information is recorded, 12) information about identification of contents information, and 13) information about accounting.

13. A method of decrypting encryption-resultant contents information generated by an encrypting side which implements the steps of generating a signal representative of a key from authenticator-value information and key base information, the authenticator-value information representing a specified authenticator value, the key base information containing identification information which is set to reproduce the specified authenticator value according to a predetermined degeneration function; encrypting at least the identification information in the key base information to convert the key base information into encryption-resultant key base information; and encrypting contents information into encryption-resultant contents information in response to the key signal; the method comprising the steps of:

decrypting the encryption-resultant key base information into the original key base information;

reproducing the authenticator-value information representative of the specified authenticator value from the identification information in the original key base information according to the predetermined degeneration function;

reproducing the key signal from the reproduced authenticator-value information and the original key base information; and decrypting the encryption-resultant contents information into the original contents information in response to the reproduced key signal.

14. An apparatus for decrypting encryption-resultant contents information generated by an encrypting side which implements the steps of generating a signal representative of a key from authenticator-value information and key base information, the authenticator-value information representing a specified authenticator value, the key base information containing identification information which is set to reproduce the specified authenticator value according to a predetermined degeneration function; encrypting at least the identification information in the key base information to convert the key base information into encryption-resultant key base information; and encrypting contents information into encryption-resultant contents information in response to the key signal; the apparatus comprising:

means for decrypting the encryption-resultant key base information into the original key base information;

means for reproducing the authenticator-value information representative of the specified authenticator value from the identification information in the original key base information according to the predetermined degeneration function;

means for reproducing the key signal from the reproduced authenticator-value information and the original key base information; and means for decrypting the encryption-resultant contents information into the original contents information in response to the reproduced key signal.

15. A method of decrypting encryption-resultant contents information generated by an encrypting side which implements the steps of generating a signal representative of a key from key base information containing identification information which is set to reproduce a specified authenticator value according to a predetermined degeneration function; and encrypting contents information into encryption-resultant contents information in response to the key signal; the method comprising the steps of:

reproducing the authenticator-value information representative of the specified authenticator value from the identification information in the key base information according to the predetermined degeneration function;

reproducing the key signal from the key base information;

deciding whether or not the reproduced authenticator-value information is correct;

decrypting the encryption-resultant contents information in response to the reproduced key signal when it is decided that the reproduced authenticator-value information is correct; and altering the reproduced key signal into a wrong key signal and decrypting the encryption-resultant contents information in response to the wrong key signal when it is decided that the reproduced authenticator-value information is not correct.

16. A method of decrypting encryption-resultant contents information generated by an encrypting side which implements the steps of generating a signal representative of a key from key base information containing identification information which is set to reproduce a specified authenticator value according to a predetermined degeneration function; encrypting at least the identification information in the key base information to convert the key base information into encryption-resultant key base information; and encrypting contents information into encryption-resultant contents information in response to the key signal; the method comprising the steps of:

decrypting the encryption-resultant key base information into the original key base information;

reproducing the authenticator-value information representative of the specified authenticator value from the identification information in the original key base information according to the predetermined degeneration function;

reproducing the key signal from the original key base information;

deciding whether or not the reproduced authenticator-value information is correct;

decrypting the encryption-resultant contents information in response to the reproduced key signal when it is decided that the reproduced authenticator-value information is correct; and altering the reproduced key signal into a wrong key signal and decrypting the encryption-resultant contents information in response to the wrong key signal when it is decided that the reproduced authenticator-value information is not correct.

17. An apparatus for decrypting encryption-resultant contents information generated by an encrypting side which implements the steps of generating a signal representative of a key from key base information containing identification information which is set to reproduce a specified authenticator value according to a predetermined degeneration function; encrypting at least the identification information in the key base information to convert the key base information into encryption-resultant key base information; and encrypting contents information into encryption-resultant contents information in response to the key signal; the apparatus comprising:

means for decrypting the encryption-resultant key base information into the original key base information;

means for reproducing the authenticator-value information representative of the specified authenticator value from the identification information in the original key base information according to the predetermined degeneration function;

means for reproducing the key signal from the original key base information;

means for deciding whether or not the reproduced authenticator-value information is correct;

means for decrypting the encryption-resultant contents information in response to the reproduced key signal when it is decided that the reproduced authenticator-value information is correct; and means for altering the reproduced key signal into a wrong key signal and decrypting the encryption-resultant contents information in response to the wrong key signal when it is decided that the reproduced authenticator-value information is not correct.

18. A method of decrypting encryption-resultant contents information generated by an encrypting side which implements the steps of generating a signal representative of a key from key base information containing identification information which is set to reproduce a specified authenticator value according to a predetermined degeneration function; and encrypting contents information into encryption-resultant contents information in response to the key signal; the method comprising the steps of:

reproducing the authenticator-value information representative of the specified authenticator value from the identification information in the key base information according to the predetermined degeneration function;

reproducing the key signal from the key base information;

deciding whether or not the reproduced authenticator-value information is correct;

decrypting the encryption-resultant contents information in response to the reproduced key signal when it is decided that the reproduced authenticator-value information is correct; and failing to decrypt the encryption-resultant contents information in response to the reproduced key signal when it is decided that the reproduced authenticator-value information is not correct.

19. A method of decrypting encryption-resultant contents information generated by an encrypting side which implements the steps of generating a signal representative of a key from key base information containing identification information which is set to reproduce a specified authenticator value according to a predetermined degeneration function; encrypting at least the identification information in the key base information to convert the key base information into encryption-resultant key base information; and encrypting contents information into encryption-resultant contents information in response to the key signal; the method comprising the steps of:

decrypting the encryption-resultant key base information into the original key base information;

reproducing the authenticator-value information representative of the specified authenticator value from the identification information in the original key base information according to the predetermined degeneration function;

reproducing the key signal from the original key base information;

deciding whether or not the reproduced authenticator-value information is correct;

decrypting the encryption-resultant contents information in response to the reproduced key signal when it is decided that the reproduced authenticator-value information is correct; and failing to decrypt the encryption-resultant contents information in response to the reproduced key signal when it is decided that the reproduced authenticator-value information is not correct.

20. An apparatus for decrypting encryption-resultant contents information generated by an encrypting side which implements the steps of generating a signal representative of a key from key base information containing identification information which is set to reproduce a specified authenticator value according to a predetermined degeneration function; encrypting at least the identification information in the key base information to convert the key base information into encryption-resultant key base information; and encrypting contents information into encryption-resultant contents information in response to the key signal; the apparatus comprising:

means for decrypting the encryption-resultant key base information into the original key base information;

means for reproducing the authenticator-value information representative of the specified authenticator value from the identification information in the original key base information according to the predetermined degeneration function;

means for reproducing the key signal from the original key base information;

means for deciding whether or not the reproduced authenticator-value information is correct;

means for decrypting the encryption-resultant contents information in response to the reproduced key signal when it is decided that the reproduced authenticator-value information is correct; and means for failing to decrypt the encryption-resultant contents information in response to the reproduced key signal when it is decided that the reproduced authenticator-value information is not correct.

* * * * *